Patented June 26, 1951

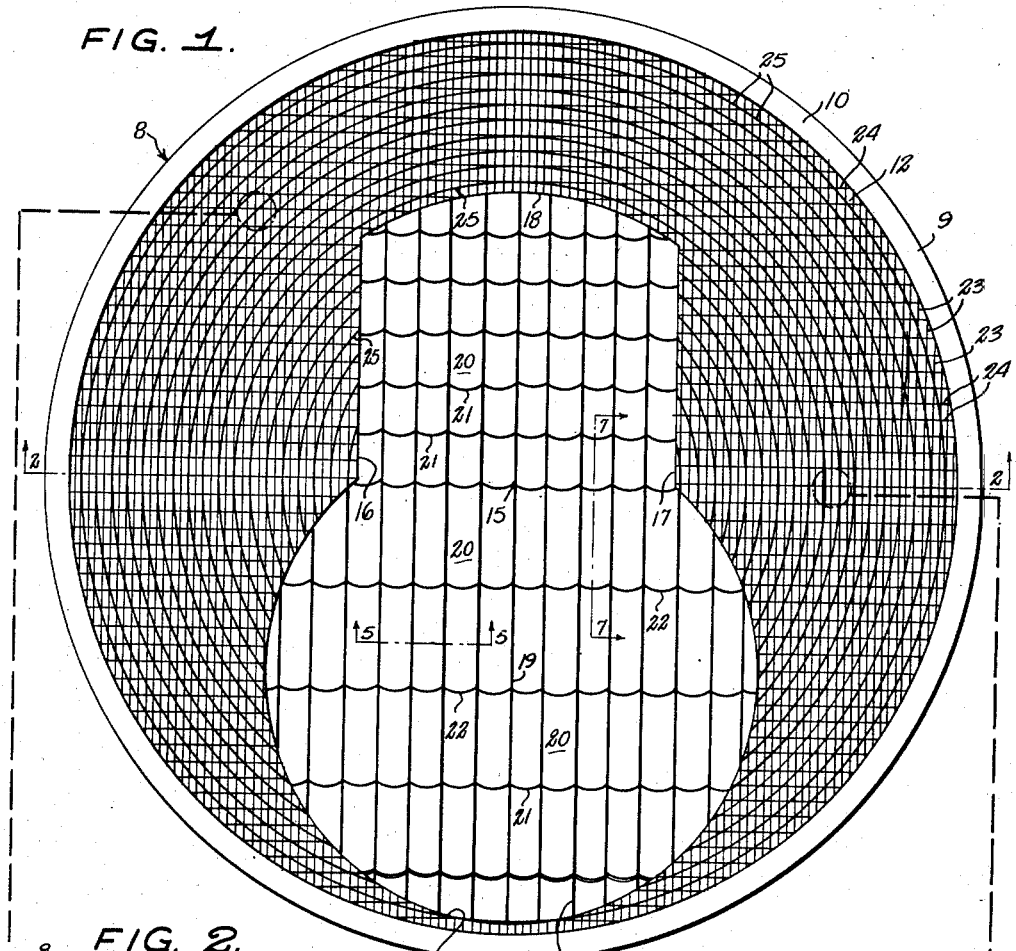
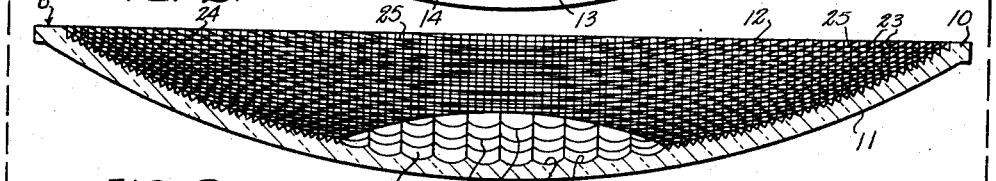
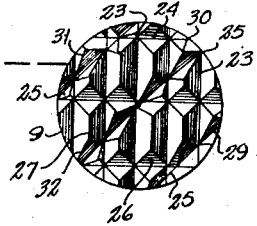

2,558,422

UNITED STATES PATENT OFFICE 2,558,422

ANTIGLARE LENS WITH A CENTRAL RETICULATED AREA AND DIFFERENTLY RETICULATED SURROUNDING AREA

Nickolas M. De Leo, Bayonne, N. J.

Application August 27, 1948, Serial No. 46,394

3 Claims. (Cl. 240—41.4)

This invention relates to automobile headlight lenses, and particularly to a headlight lens with a plurality of differently-reticulated areas.

The main object of my invention is to provide a special lens of the indicated character which serves to eliminate the objectionable glare usually associated with a headlight upon an automobile and thereby also to eliminate an element of danger from driving at night.

Another object is to provide such a headlight lens which has a longer light beam than produced by conventional headlight lenses.

A further object is to have a headlight lens of the character indicated which is reticulated in special manner in two different areas to provide a prismatic control of the light beam according to a predetermined arrangement of these areas.

An ancillary object is to have such a lens which is easily adapted for inclusion in present headlight construction.

It is also an incidental object to arrange the two different areas of the headlight lens in such fashion as to produce an ornamental appearance of the lens as a whole.

Other objects and advantages of the invention will appear in further detail as the specification proceeds.

In order to facilitate ready comprehension of this invention for a proper appreciation of the salient features thereof, the invention is illustrated on the accompanying drawing forming part thereof, and in which:

Figure 1 is a rear elevation of an automobile headlight lens made according to the invention and embodying the same in a practical form;

Figure 2 is a transverse section taken on line 2—2 in Figure 1;

Figure 3 is an enlarged fragmentary elevation of a small circular section of the headlight lens of Figure 1, as indicated by the small broken-line circles in the upper left portion of such figure;

Figure 4 is another enlarged fragmentary elevation of a portion of the lens of Figure 1, as indicated by the brokenline circle at the right center in said figure;

Figure 5 is a fragmentary transverse section taken on line 5—5 in Figure 1;

Figure 6 is a transverse section taken on line 6—6 in Figure 4;

Figure 7 is a fragmentary section taken on line 7—7 in Figure 1.

In the views, the same reference numerals indicate the same or like parts.

The sharp glare of headlights at night upon automobiles has long been not only a serious nuisance, but a potential source of danger, because when two cars mutually approach each other with the headlights on, the light beams from the headlights on each car so seriously interfere with the proper vision on the part of the driver of the respective other car that both drivers involved are in great danger of losing control of their respective cars, and all too often actually do with tragic results. Various attempts have been made to overcome the glare, but up to the present nothing has been generally adopted to mitigate the condition.

In view of this situation, it has occurred to me that if the lens of a normal automobile headlight is reticulated in a special manner and proper arrangement is provided, the light rays will be directed in such manner as to project a very long beam and eliminate the glare. Hence, after duly considering this problem, I have succeeded in evolving a headlight lens with such characteristics that the outlined disadvantages are avoided and the foregoing objects fulfilled, as will now be particularly described.

Hence, in the practice of my invention, and referring again to the drawing, a headlight lens for an automobile, generally indicated at 8, primarily includes a convex glass disc 9 having a substantially flat peripheral flange 10, a convex outer forward surface 11 and a concave rear or interior surface 12 of one character, while a further differently-reticulated surface 13 is included upon the concave side of the lens, as will be described in further detail. The generally-concave interior surface 12 extending from flange 10 inwardly at varying distances from the edge terminates abruptly about the outline of the intermediate reticulated portion 13, this intermediate area being substantially circular up to a horizontal line coinciding with the center of the lens and above said line the same intermediate area extends upwardly more than half the distance from the center 15 to the sides 16, 17 and terminates at an upper arc 18 struck from the same center 15 as the periphery of the entire lens, the lower circle 14 being drawn on the center 19 disposed a distance below the main center 15 of the lens. The mentioned intermediate area defined within the circle 14, the vertical sides 16 and 17 and the upper arcuate end 18 virtually forms an enlarged keyhole design in inverted position in which a series of superposed rows of arcuate channel portions 20, 20 are formed with the upper rows above the center 15 being shorter, as indicated at 21, 21, than the lower rows 22, 22, but each row overhanging the row immediately below it to present the appearance shown in Figure 7, so that the rows thus, superficially at least, are arranged as shingles on the sides of a house. In every instance, each concave channel portion 20 within the mentioned intermediate area thus forms a negative prismatic lens tending to diffuse the light striking these negative lens portions.

The entire remaining area of the concave side 12 of the lens 9 and surrounding said intermediate area is reticulated according to a system which involves a series of equidistantly-spaced vertical lines 23, 23, a second series of equidistantly-spaced, horizontal lines 24, 24 which are disposed a greater distance apart than the lines 23, 23 from each other, and a series of arcuate or circular lines equidistantly spaced from the center 15 in progressive spacing away from the center outward toward the flange 10, as indicated at 25, 25. As best seen in Figures 3, 4 and 6, vertical lines or cuts 23 are actually V-shaped grooves, which is also true of the transverse or horizontal lines 24, 24, resulting in the elongated, pyramid-shaped prisms 26, 26, according to Figure 4, representing a small area of the lens substantially along the horizontal center line of the lens indicated at the small circle in Figure 1 intermediate the previously-described central area and the flange 10. Along the mentioned horizontal position upon the lens, as well as along the line drawn vertically from the center 15, the circular lines 25 which also represent V-shaped grooves, are scarcely noticeable, but when the horizontal center line, or even the vertical center line in either case is departed from above or below or at either side thereof, as indicated for example by the small circle at the upper left portion of the lens, then the V-shaped grooves represented by the circles or arcs 25, 25 add further features to the prisms 26, 26 by introducing more or less inclined V-shaped grooves cutting into the prisms, as best seen in Figure 3, and introducing circular refraction into the lens as a whole, while the prisms 26, 26 generally tend to diffuse the light away from the deepest portions of the V-shaped grooves 23 and 24 to bring the rays out toward the apices 27, 27 of the prisms. Due to the presence of the arcuate or circular grooves 25, 25, the prisms in large sections of the lens are cut into smaller prism sections providing a larger number of facets on these prisms than would be the case if merely the vertical and horizontal V-shaped grooves 23 and 24 were present, as especially evident at 29, 30, 31 and 32, etc. In the larger area 12 of the lens thus broken up into a large number of small prisms, the light is broken up into a very large number of small individual rays which precludes the escape of any glare, and similar remarks apply to the inner or intermediate area defined by the keyhole design referred to within circle 14 on the upper projecting section connected therewith within the sides 16 and 17 and below arc 18 from which the main beam of light will be projected to a distance in the form of a very long beam, in view of the concave nature of the negative or arcuately-concave prismatic features 20, 20, so that the light issuing from this area is distinct in character from that which more diffusely escapes from the area outside said intermediate area. Inasmuch as the modified areas described are located upon the concave side of the lens facing the interior light source of the headlight, the rays will, of course, first strike the reticulated and the concavely-arcuate areas and then pass through the thickness of the wall of the lens to the outer curved side or face 11 thereof and thus a long light beam will issue from the intermediate portion of said surface in the forward direction, yet without glare, because the light rays are not so much concentrated as they are segregated by the two different areas of the lens.

Manifestly, variations may be resorted to and parts and features may be modified and used without others within the scope of the appended claims.

Having now fully described my invention, I claim:

1. An automobile headlight lens having a convex exterior side and a concave interior side divided into two distinct and different optical areas, including an intermediate area which is generally circular from the central portion of the lens downward toward the lower edge thereof and substantially rectangular vertically from said central portion upward with a lesser width than the transverse diameter of the central circular portion and terminates at the upper end in an arc derived from said central portion, said intermediate area being subdivided into a series of horizontal rows of erect negative cylindrical arcuate portions with each row protruding at the lower end thereof beyond the upper end of the next adjacent row below, and a second area surrounding said intermediate area and extending from the latter toward the periphery of said lens, said second area surrounding said intermediate area and being sub-divided by a series of equidistantly-spaced vertical V-shaped cuts, a series of transverse or horizontal V-shaped cuts spaced a greater distance apart than said vertical V-shaped cuts, and a series of equidistantly-spaced arcuate or circular V-shaped cuts derived from the center of said lens and concentric with the periphery thereof.

2. An automobile headlight lens having a convex exterior side and a concave interior side divided into a first and second distinct and different optical area, said first area being formed intermediate the second area and being divided into a series of horizontal rows of exact negative portions, each of said portions being arcuately shaped along its longitudinal axis, and each row slightly overlapping the succeeding lower row; said second area surrounding the first area and extending from the latter to the periphery of the lens, a series of vertical V-shaped grooves formed in the second area, a series of horizontal V-shaped grooves intersecting said vertical grooves at right angles thereto and a series of circular V-shaped cuts formed on the second area and bisecting the vertical and horizontal grooves, said circular grooves being concentric with the periphery of the lens.

3. An automobile headlight lens characterized by a concave interior side divided into a first and second distinct and different optical area, the first area being centrally disposed and formed with horizontal rows of arcuate channel portions, with each row slightly overlapping the succeeding lower row; said second area surrounding the first area and extending to the periphery of the lens, said second area being inscribed with an intersecting series of horizontal and vertical V-shaped cuts and circular V-shaped cuts concentric to the periphery of the lens.

NICKOLAS M. DE LEO.

REFERENCES CITED

The following references are of record in the file of this patent:

UNITED STATES PATENTS

| Number | Name | Date |
| --- | --- | --- |
| 1,074,537 | Abeles | Sept. 30, 1913 |
| 1,245,836 | Waggoner | Nov. 6, 1917 |
| 1,246,093 | Harthan | Nov. 13, 1917 |
| 1,509,300 | Judia | Sept. 23, 1924 |
| 1,797,012 | Montgomery | Mar. 17, 1931 |
| 1,887,107 | Smith | Nov. 8, 1932 |